(12) United States Patent
Schmittner et al.

(10) Patent No.: US 9,255,832 B2
(45) Date of Patent: *Feb. 9, 2016

(54) BENDING BEAM LOAD CELL WITH ENCLOSURE

(75) Inventors: Arno Schmittner, Rossdorf (DE); Ralf Scherer, Mainz (DE)

(73) Assignee: Hottinger Baldwin Messtechnik GmbH, Darmstadt (DE)

( * ) Notice: Subject to any disclaimer, the term of this patent is extended or adjusted under 35 U.S.C. 154(b) by 366 days.

This patent is subject to a terminal disclaimer.

(21) Appl. No.: 13/141,561

(22) PCT Filed: Dec. 16, 2009

(86) PCT No.: PCT/DE2009/009004
§ 371 (c)(1),
(2), (4) Date: Jun. 22, 2011

(87) PCT Pub. No.: WO2010/072364
PCT Pub. Date: Jul. 1, 2010

(65) Prior Publication Data
US 2012/0061151 A1 Mar. 15, 2012

(30) Foreign Application Priority Data
Dec. 22, 2008 (DE) .......................... 10 2008 064 169

(51) Int. Cl.
*G01L 1/26* (2006.01)
*G01G 3/12* (2006.01)
*G01G 21/30* (2006.01)

(52) U.S. Cl.
CPC .................. *G01G 3/12* (2013.01); *G01G 21/30* (2013.01); *G01L 1/26* (2013.01)

(58) Field of Classification Search
CPC ....... G01G 3/12; G01G 23/005; G01G 21/30; G01L 1/26

USPC .......................................... 177/211, 229, 238; 73/862.621–862.642
See application file for complete search history.

(56) References Cited

U.S. PATENT DOCUMENTS 3,592,054 A   7/1971  Stewart et al.
3,788,133 A   1/1974  Paelian et al.
(Continued)

FOREIGN PATENT DOCUMENTS

CN    2 253 469 Y    4/1997
CN    201107105 Y    8/2008
(Continued)

OTHER PUBLICATIONS

International Search Report of the International Searching Authority for International Application PCT/EP2009/009004, mailed Mar. 16, 2010, 2 pages, European Patent Office, HV Rijswijk, Netherlands.
(Continued)

*Primary Examiner* — Randy W Gibson
(74) *Attorney, Agent, or Firm* — W. F. Fasse

(57) ABSTRACT

A load cell includes a longitudinal body including force input and output elements and a bending beam, strain gages, and a hermetically sealed enclosure. A force applied onto the input element perpendicularly to the longitudinal axis causes bending strain of the beam, which is measured by the strain gages. The enclosure includes a stiff pipe sleeve and two ring elements, which each include a membrane that is more flexible than the pipe sleeve, and which support the pipe sleeve relative to and spaced radially away from the longitudinal body. The membranes preferably decouple the pipe sleeve from the longitudinal body so that essentially none of the applied force is shunted into the pipe sleeve. Preferably a cylindrical outer surface of the pipe sleeve can avoid accumulation of contaminants.

25 Claims, 1 Drawing Sheet

(56) References Cited

U.S. PATENT DOCUMENTS

| | | | |
|---|---|---|---|
| 3,917,981 A * | 11/1975 | Keen | 361/120 |
| 4,020,686 A | 5/1977 | Brendel | |
| 4,196,784 A * | 4/1980 | Suzuki et al. | 177/211 |
| 4,453,422 A | 6/1984 | Yorgiadis | |
| 4,596,155 A | 6/1986 | Kistler | |
| 4,619,147 A | 10/1986 | Yoshimura et al. | |
| 4,733,571 A * | 3/1988 | Ormond | 73/862.622 |
| 4,804,053 A * | 2/1989 | Nordstrom | 73/862.622 |
| 4,815,547 A | 3/1989 | Dillon et al. | |
| 4,932,253 A * | 6/1990 | McCoy | 73/152.61 |
| 4,957,177 A * | 9/1990 | Hamilton et al. | 177/211 |
| 5,509,317 A | 4/1996 | Gross | |
| 5,566,575 A | 10/1996 | Will et al. | |
| 5,866,854 A * | 2/1999 | Emery | G01G 23/012 177/210 EM |
| 5,895,894 A * | 4/1999 | Zumbach | 177/180 |
| 6,555,767 B1 | 4/2003 | Lockery et al. | |
| 6,694,829 B2 | 2/2004 | Chimura et al. | |
| 6,789,435 B2 | 9/2004 | Hopkins | |
| 7,176,391 B2 * | 2/2007 | Metz | A61G 7/012 177/144 |
| 7,432,457 B2 | 10/2008 | Vayhinger et al. | |
| 8,153,913 B2 | 4/2012 | Haefeli et al. | |
| 2002/0069708 A1 | 6/2002 | McKenna | |
| 2004/0060372 A1* | 4/2004 | Hopkins | 73/862.637 |
| 2007/0007049 A1* | 1/2007 | Kuchel et al. | 177/211 |
| 2007/0089581 A1 | 4/2007 | Sandberg et al. | |
| 2007/0277621 A1 | 12/2007 | Schlachter et al. | |
| 2013/0074610 A1 | 3/2013 | Schmittner et al. | |

FOREIGN PATENT DOCUMENTS

| | | | | |
|---|---|---|---|---|
| CN | 201210079 Y | | 3/2009 | |
| CN | 101581600 A | | 11/2009 | |
| DE | 37 15 572 | | 11/1968 | |
| DE | 2 117 424 | | 10/1972 | |
| DE | 28 18 140 | | 11/1979 | |
| DE | 38 24 636 | | 1/1990 | |
| DE | 102004027619 | | 1/2006 | |
| DE | 102004047508 | | 4/2006 | |
| EP | 0139176 | * | 7/1989 | G01G 3/14 |
| EP | 0319176 | * | 7/1989 | G01G 3/14 |
| EP | 1 698 871 | | 9/2006 | |
| GB | 1 106 877 | | 3/1968 | |
| GB | 2 020 440 | | 11/1979 | |
| GB | 2 150 307 | | 6/1985 | |
| JP | 59-031026 U | | 2/1984 | |
| JP | 01-250028 A | | 10/1989 | |
| JP | 10-339676 A | | 12/1998 | |
| JP | 2001-099698 A | | 4/2001 | |
| JP | 2001-343294 A | | 12/2001 | |
| JP | 2006-349659 A | | 12/2006 | |

OTHER PUBLICATIONS

English Translation of PCT Written Opinion of the International Searching Authority for International Application PCT/EP2009/009004, mailed Mar. 16, 2010, 5 pages, European Patent Office, HV Rijswijk, Netherlands.

German Office Action in German Patent Application No. 10 2008 064 169.3-53, mailed Sep. 10, 2009, 3 pages, with partial English translation, 2 pages.

German Office Action in German Patent Application No. 10 2010 014 152.6-53, mailed Jan. 12, 2011, 4 pages, with partial English translation, 4 pages.

Chinese Office Action in Chinese Patent Application No. 200980112921.4, mailed Oct. 29, 2012, 6 pages, with partial English translation, 4 pages.

Partial English translation of Japanese Office Action in Japanese Patent Application No. 2011-541196, mailed Nov. 12, 2013, 5 pages.

PCT International Preliminary Report on Patentability including English Translation of PCT Written Opinion of the International Searching Authority for International Application PCT/EP2011/001701, issued Oct. 9, 2012, 10 pages, International Bureau of WIPO, Geneva, Switzerland.

Office Action and Notice of References Cited in U.S. Appl. No. 13/639,587, mailed Nov. 17, 2014, 16 pages.

Chinese Search Report (2 pages) from Chinese Office Action mailed Jun. 4, 2014 in Chinese Patent Application No. 201010510746.9, with English translation (2 pages), Chinese counterpart of U.S. Appl. No. 13/639,587.

English translation (2 pages) of Japanese Office Action mailed Sep. 17, 2014 in Japanese Patent Application No. 2011-541196, Japanese counterpart of U.S. Appl. No. 13/141,561.

English translation (human-prepared) of Japanese Patent Application Publication 2001-099698A, published Apr. 13, 2001.

* cited by examiner

BENDING BEAM LOAD CELL WITH ENCLOSURE

CROSS-REFERENCE TO RELATED APPLICATION

This application is related to U.S. application Ser. No. 13/639,587 having a US filing date of Dec. 14, 2012.

FIELD OF THE INVENTION

The invention relates to a load cell of the bending beam type, preferably for an aseptic platform scale, and having a sealed enclosure.

BACKGROUND INFORMATION

Load cells are special cases of the force transducer or pick up, and are provided for the construction of weighing devices. Such weighing devices are often also used in the supply of foodstuffs, so that they often must satisfy special hygiene regulations. Therefore, it is also necessary for the load cells used in those applications, that these are constructed so that no dirt and no foodstuff residues can permanently collect on their surfaces, or at least must be easily removable. Furthermore, there are often horizontal surfaces, gaps and depressions on such load cells, which are hardly accessible and therefore can only be cleaned with difficulty, where then bacteria, viruses and fungi easily deposit and take hold. Therefore, in the use of load cells in many areas of the chemical, pharmaceutical, cosmetic, and foodstuff industries, it is necessary that these are easy to clean and if possible have no surface areas on which dirt, foodstuff residues, chemicals, bacteria, viruses and fungi can become deposited and take hold, penetrate, or build-up.

A hermetically sealed measured value pick-up or transducer, which represents a load cell, is known from the DE 10 2004 047 508 B3, which is embodied as a horizontally installable bending beam. This bending beam consists of a force introduction or input part and a force output part, between which a force measuring element is arranged. In that regard, the force measuring element consists of a vertical bending spring, which was produced by two oppositely directed horizontal transverse bored holes in the middle bending beam part, and on which strain gage strips are applied on both sides as shear force pick-ups or transducers, which produce a proportional electrical signal in connection with a weight loading. For the hermetic sealing in that regard, pot-shaped metallic sheet metal parts are welded into the bored holes, and hermetically tightly enclose the sensitive electrical measuring elements. Thereby it is primarily prevented, that moisture and other corrosive dirt particles come into contact with the sensitive measuring elements, so that a load cell having a long life is produced. While this load cell is rod shaped and equipped with largely flat exterior surfaces, whereby however foodstuff or liquid residues can deposit especially on the horizontally extending cover surface, and these residues in connection with moisture tend to cause an increase or multiplication of bacteria or viruses. Moreover, dirt and foodstuff components could also adhere in the pot-shaped depressions, which may only be cleaned with difficulty, and in which fungi and bacteria could form. Therefore, even such a hermetically sealed load cell is often not usable in aseptic areas or fields according to the applicable hygiene regulations.

From the DE OS 37 15 572, a load cell for an electromechanical platform scale is known, which essentially consists of a cylindrical round rod, from which at least flowable foodstuffs and liquids would run-off by means of gravity. In that regard, one side of the bending rod is secured by means of two screws on the scale housing, while the opposite end as a flattened round rod is connected with the weighing platform, whereby the weight force is introducible transversely to the longitudinal direction. However, in this load cell, the strain gage strips may be applied on the surface of the bending rod for producing the electrical measurement signals, so that such a load cell cannot be cleaned with watery or aqueous cleaning agents, and therefore is not always usable in the foodstuff industry or in aseptic areas or fields.

A further load cell with cylinder-shaped horizontally arranged housing is known from the DE OS 28 18 140, which is to be completely protected with respect to foreign influences. In that regard, a horizontal round rod is arranged in the housing body, and is secured at its one end region in a free carrying pipe. On the outer circumferential surface of the free carrying pipe, strain gage strips are applied, which pick-up and measure a strain on the outer circumferential surface of the pipe in connection with a vertical force introduction into the end point of the rod. In that regard, the free carrying pipe is hermetically tightly enclosed by a cylinder-shaped enclosure sleeve as a housing part. However, the force introduction is carried out via a threaded bolt in a chamber that is open at least toward the bottom, and in which a force introduction eye grasps around the rod, which is movably guided in this open chamber. Because this chamber is not hermetically enclosed, dirt and liquid residues can penetrate therein and are hardly removable, so that this load cell is not usable in contact with foodstuffs.

An installation or mounting set for a load cell is previously known from the EP 1 698 871 A1, and is especially usable in the area or field of the chemical and pharmaceutical, the foodstuff and cosmetic industry. In that regard, this installation or mounting set includes a vertically arranged load cell, which is arranged between two parallel horizontally arranged mounting plates. Apparently, two round compression parts are provided as force introduction or input and force output elements, between which the load cell is arranged. In that regard, the load cell is arranged enclosed in a round conically extending housing, which engages into the compression parts or encompasses these so that this installation or mounting set is well cleanable and apparently has few gaps and hollow spaces in which bacteria, viruses and fungi could form. However, hereby the compression parts as force input or force output elements are only loosely connected with the load cell, so that such a load cell can only be installed vertically and also cannot be connected securely with the scale, so that another installation or mounting set will always additionally be necessary.

SUMMARY OF THE INVENTION

Therefore it is an object of embodiments of the invention to further develop a hermetically sealed load cell so that it is easily cleanable and includes no gaps, depressions and horizontal surface parts in and on which residues, dirt, bacteria, viruses or fungi can be deposited or multiplied, so that it is also usable in an aseptic environment, especially in equipment for foodstuff processing.

The above object can be achieved in an embodiment of the invention in a load cell comprising a longitudinal body, strain gages, and a hermetically sealed enclosure. The longitudinal body extends along a longitudinal axis and comprises a force input element, a force output element, and a bending beam. The bending beam is arranged axially between and connected to the force input element and the force output element. The bending beam includes strainable measuring parts, and is arranged and configured so that a force to be measured, which is applied perpendicularly to the longitudinal axis onto the force input element, will cause bending of the bending beam and therewith a measurable strain in the strainable measuring parts. The strain gages are applied on the strainable measuring parts so as to measure the strain thereof. The hermetically sealed enclosure encloses the strainable measuring parts and the strain gages applied thereon. The enclosure comprises a flexurally stiff pipe sleeve and two ring elements that each respectively comprise a flexurally soft membrane that is more flexible than the pipe sleeve. The ring elements are connected to and protrude radially outwardly from the longitudinal body. The ring elements are connected to and support the pipe sleeve relative to and spaced radially away from the longitudinal body, with the membranes interposed between the pipe sleeve and the longitudinal body. Thereby, the membranes may preferably decouple the pipe sleeve from the longitudinal body so that essentially none of the applied force is coupled into the pipe sleeve. Thereby, essentially all of the force is directed through the strainable measuring parts and a high measurement accuracy can be achieved. Furthermore, an outer surface of the pipe sleeve is a cylindrical outer surface parallel to and coaxial about the longitudinal axis. Thereby preferably the abovementioned object of avoiding the accumulation of contaminants can be achieved, because the surface preferably includes no gaps or depressions in which contaminants such as foodstuff residues, dirt, bacteria, etc. can accumulate.

An embodiment of the invention has the advantage that due to the horizontal installation position it also comprises only vertically declining surface parts, so that all foodstuffs, cosmetics or pharmaceutical components coming in contact therewith can only be deposited with difficulty, whereby a formation of fungi, viruses or bacteria is largely prevented.

Due to the welded encapsulation of the load cell, this is also well cleanable and disinfectable with watery or aqueous solutions, so that such load cells advantageously can also be used in the aseptic area or field.

In a particular embodiment of the invention it is provided that the force measuring element is embodied as a double bending beam with which very high measuring accuracies are advantageously achievable. Therefore, also scales that must be calibrated are advantageously producible with such load cells.

In a different particular embodiment, the entire load cell consists of a high strength, high grade stainless steel so that such a load cell can be used even with high humidity and aggressive environmental influences, and thus represents a very long-lived embodiment and which also is not attacked by most chemicals or pharmaceutical raw materials. Thereby it is especially advantageous, to taper the closed ring elements circumferentially in such a manner so that they form membranes, whereby advantageously a measuring element arises that is encapsulated all around, and that comprises outwardly flat or smooth rounded surfaces that are well cleanable, without exerting a significant force shunt effect on the actual measuring element. Whereby simultaneously a high measuring accuracy is also ensured.

Through the special nearly cylindrical embodiment of the force input and force output elements, advantageously an embodiment is achieved that can be used in flat platform scales. Thereby the force input and force output elements are equipped with parallel vertical or parallel horizontal securing surfaces, so that they advantageously allow a horizontal or vertical securing.

In a further special embodiment it is additionally still provided, to provide the load cell with a protective layer, which comprises a surface with difficult adhesion, so that friable or flowable or liquid materials that come in contact therewith will flow off without leaving behind residues, and so that a germ formation especially of illness germs is prevented even without any mentionable cleaning measures.

BRIEF DESCRIPTION OF THE DRAWINGS

The invention will be explained in further detail in connection with an example embodiment, which is illustrated in the drawing. It is shown by.

DETAILED DESCRIPTION OF EXAMPLE EMBODIMENTS OF THE INVENTION

Figure 1:
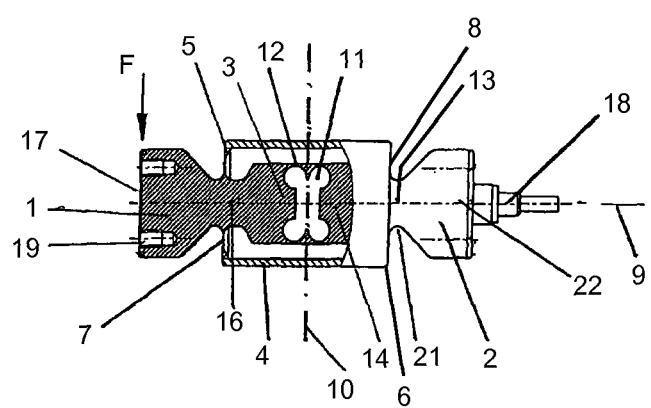
FIG. 1: a hermetically sealed load cell with vertical securing surfaces.

In FIG. 1 of the drawing, a hermetically sealed load cell is shown, which is embodied rotationally symmetrically, whereby a double bending beam 3 is arranged in the longitudinal direction between the force input element 1 and force output element 2, which double bending beam 3 is enclosed by two ring elements 5, 6 provided at its end regions, and a pipe sleeve 4 that is welded therewith, whereby the ring elements 5, 6 include concentrically encircling thin locations as membranes 7, 8, which connect the pipe sleeve 4 in a flexurally or bendably soft manner with the force input element 1 and the force output element 2 and the double bending beam 3.

The load cell basically consists of a central longitudinal body, from which the force input element 1, the force output element 2, the double bending beam 3 and the two ring elements 5, 6 are machined. Thereby, the longitudinal body preferably consists of a high-value, high-grade flexurally elastic stainless steel, over which the pipe sleeve 4 is tipped in the finished condition and is welded in an airtight manner with the two ring elements 5, 6. For a load cell with a 10 kg rated load, the central longitudinal body is preferably 120 mm long and approximately 40 mm in diameter. The double bending beam 3 is arranged between the force input element 1 and the force output element 2, and includes a parallelepiped block shaped middle part 14. A horizontal cut-out recess 11 is provided in the middle part 14 symmetrically to a longitudinal axis 9 and a transverse axis 10, whereby the recess 11 comprises a clover leaf type cross-section due to four horizontal bored holes. Thereby, webs 12 forming so-called measuring spring parts or strainable measuring parts arise on the two parallel horizontal cover surfaces of the middle part 14, and preferably eight strain gage strips are applied on webs 12, whereby under a vertical force loading, i.e. input weight force F applied perpendicularly to the longitudinal axis 9, the strain gage strips produce an electrical signal that is proportional to the introduced weight force F.

Two tapering round connecting pieces 13, 16 are applied or mounted on the two ends of the middle part 14, which pieces connect the double bending beam 3 on one side with the force input element 1 and on the opposite side with the force output element 2. Approximately in the middle of each one of the axial connecting pieces 13, 16, respectively one ring element 5, 6 is applied or mounted transversely to the longitudinal axis 9, wherein the outer diameter of the ring element corresponds to the inner diameter of the pipe sleeve 4 and is larger than the diameter of the force input element 1 and of the force output element 2, and preferably amounts to approximately 39 mm. The two ring elements 5, 6 are concentrically tapered in a concave manner on the annular ring surface facing toward the double bending beam 3, and thereby form a concentrically encircling first membrane 7 and second membrane 8, of which the thickness preferably amounts to 0.3 mm.

The round connecting pieces 13 and 16 preferably comprise a diameter of 16 mm. The force input element 1 and the force output element 2 are respectively arranged in the axial direction laterally next to and connected to the first connecting piece 16 and the second connecting piece 13 respectively. From there, the force input element 1 and the force output element 2 both expand outwardly conically to preferably a 38 mm diameter through an encircling circumferential groove 21, in order to then transition into a cylindrical form of approximately 16 mm length, which then ends in a flat end face 17 as a vertical securing surface. Thereby, both the force input element 1 as well as the force output element 2 are identically embodied in their external shape, and are both arranged symmetrically to the longitudinal axis 9 and transverse axis 10. In the force output element 2, in the longitudinal direction, a central longitudinal bored hole 22 is still provided, which extends at least to the recess 11, and in which the connection lines for the strain gage strips are guided. Therefore, a connecting cable 18 is still further secured in a sealed manner in the force output element 2, in which connecting cable the connecting lines are guided to the outside in a sealed manner.

For securing the load cells on a scale frame, two horizontal threaded bored holes 19 are still further applied on the end face 17 of the force output element 2, and for the securing of a weighing platform two same-type threaded bored holes 19 are provided similarly on the end face of the force input element 1. Thereby the two parallel end faces 17 represent vertical securing surfaces, so that such load cells are usable not only for platform scales but also for any other weighing devices in which the weight force F is introducible perpendicularly to the longitudinal axis 9 into the end face 17 of the load cell.

After applying and wire-connecting the strain gage strips, the double bending beam is hermetically enclosed by means of a pipe sleeve 4 that is slid over it, by welding the pipe sleeve 4 with the ring elements 5, 6. In that regard, the pipe sleeve 4 also preferably consists of a high-strength high-grade stainless steel. The length of the pipe sleeve 4 corresponds to the spacing distance between the two ring elements 5 and 6, with the radial outer edges of which the pipe sleeve 4 is welded in an airtight manner. In that regard, the pipe sleeve 4 is embodied flexurally stiff, whereby the outer circumferential surface thereof comprises only a small prescribed roughness, which is preferably producible by an electro-polishing, so that this has a surface that allows good running-off and is easy to clean.

Figure 2:
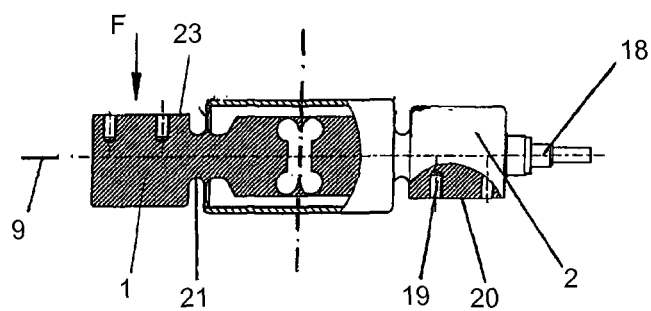
FIG. 2: a hermetically sealed load cell with horizontal securing surfaces.

An alternative embodiment of a load cell is illustrated in FIG. 2 of the drawing, whereby this load cell differs from the load cell according to FIG. 1 of the drawing only in the embodiment of the force input element 1 and the force output element 2. In that regard, the load cell according to FIG. 2 of the drawing is provided for a horizontal securing in a weighing device. For that purpose, a flattening 23 is provided on the top of the cylindrical surface of the force input element 1 and a flattening 23 is provided on the bottom of the force output element 2, as planar horizontal securing surface 20, into which respectively two threaded bored holes 19 are introduced perpendicularly to the longitudinal axis 9. Thereby the load cell can support itself, with the flattening 23 on the force output element 2, on the bottom on a scale frame, and a weighing platform can be horizontally secured directly on the flattening 23 on the top. With correspondingly adapted securing elements on the weighing platform and the scale frame, the force input element 1 and the force output element 2 could, however, also be embodied cylindrically without flattening. Therefore both embodiments of the load cells are essentially rotationally symmetrically embodied and preferably provided for a horizontal installation.

Due to the covering of the flat or flattened securing surfaces 17, 20 by securing elements of the weighing device, both embodiments have only downwardly sloping, rounded-off surfaces on which friable or flowable or liquid goods can flow away downwardly. Because the entire surfaces of the load cell preferably are embodied with only a small or low roughness, and comprise no undercut and no tight gaps, friable or flowable goods or liquids can hardly adhere thereon. In a further embodiment it is still additionally provided to provide the load cell additionally with a difficult adhering surface coating, such as, e.g. polytetrafluoroethylene (Teflon), whereby an adhesion is additionally prevented and the cleaning possibility is improved. Therefore such load cells are preferably usable in the foodstuff supply, whereby any germ formation especially of the illness germs or their multiplication must be prevented.

Due to the production of the load cells of high-grade stainless steel and the encapsulation of the double bending beam by the welding of the pipe sleeve 4 with the high-grade stainless steel ring elements 5, 6, a penetration of germ-forming substances is absolutely prevented, so that such load cells are also usable in aseptic areas or fields. Thereby, especially through the two membranes 7, 8 on the annular ring surfaces, a decoupling of the introduced weight force F is achieved, so that nearly no force shunt coupling to the flexurally stiff pipe sleeve 4 arises, so that a high measurement accuracy is achievable. Therefore, also highly exact, calibratable scales can also be produced with such load cells.

The invention claimed is:

1. A load cell comprising:
 a longitudinal body that extends along a longitudinal axis and that comprises a force input element, a force output element, and a bending beam, wherein said bending beam is arranged axially between and connected to said force input element and said force output element, wherein said bending beam includes strainable measuring parts, and wherein said bending beam is arranged and configured so that a force to be measured, which is applied perpendicularly to said longitudinal axis onto said force input element, will cause bending of the bending beam and therewith a measurable strain in said strainable measuring parts;
 strain gages applied on said strainable measuring parts of said bending beam so as to measure said measurable strain; and
 a hermetically sealed enclosure that encloses said strainable measuring parts and said strain gages on said strainable measuring parts, and that comprises a flexurally stiff pipe sleeve and two ring elements, wherein each one of said ring elements respectively comprises a respective flexurally soft membrane that is more flexible than said pipe sleeve, said pipe sleeve extends longitudinally and coaxially along said longitudinal axis and outwardly around said strainable measuring parts and said strain gages, said ring elements are each respectively connected to and protrude radially outwardly from said longitudinal body, said two ring elements are respectively hermetically sealedly connected to opposite ends of said pipe sleeve and support said pipe sleeve relative to and spaced radially outwardly away from said longitudinal body with said flexurally soft membranes interposed between said pipe sleeve and said longitudinal body, and said pipe sleeve has a cylindrical outer surface parallel to and coaxial about said longitudinal axis.

2. The load cell according to claim 1, wherein said flexurally soft membranes are sufficiently flexurally soft to avoid shunting of any significant portion of said force from said longitudinal body into said flexurally stiff pipe sleeve.

3. The load cell according to claim 1, wherein said cylindrical outer surface of said pipe sleeve is a smooth coaxially-rounded cylindrical surface without depressions.

4. The load cell according to claim 1, wherein said longitudinal body, said pipe sleeve and said ring elements all consist of stainless steel.

5. The load cell according to claim 1, wherein said longitudinal body further comprises a first connecting piece interposed between and connecting said force input element and said bending beam, and a second connecting piece interposed between and connecting said force output element and said bending beam,
wherein said first and second connecting pieces each respectively have an outer diameter that is smaller than respective outer diameters of said force input element, said bending beam and said force output element,
wherein a first one of said ring elements protrudes radially outwardly from said first connecting piece at a first position between said force input element and said bending beam, and
wherein a second one of said ring elements protrudes radially outwardly from said second connecting piece at a second position between said force output element and said bending beam.

6. The load cell according to claim 1, wherein said force input element, said bending beam, said force output element, and said two ring elements are all together formed as a single integral monolithic piece.

7. The load cell according to claim 1, wherein said ring elements are respectively connected to said pipe sleeve by respective welds.

8. The load cell according to claim 1, wherein said ring elements consist of stainless steel.

9. The load cell according to claim 1, wherein said membranes are respectively formed as annular thinner portions of said ring elements that are annularly concentrically tapered about said longitudinal axis.

10. The load cell according to claim 9, wherein said thinner portions each respectively have an annular concave depression on a disc surface of a respective one of said ring elements.

11. The load cell according to claim 10, wherein said disc surface of each respective one of said ring elements having said annular depression thereon faces inwardly toward said bending beam in said hermetically sealed enclosure.

12. The load cell according to claim 11, wherein each respective one of said ring elements further has a flat planar annular disc surface facing outwardly opposite said annular depression thereof.

13. The load cell according to claim 1, wherein said bending beam comprises a double bending beam structure comprising a parallelepiped block-shaped middle part having a cut-out recess therein to form two remaining parallel webs as said strainable measuring parts on which said strain gages are applied.

14. The load cell according to claim 1, wherein said longitudinal body has therein a central longitudinal hole extending axially through said force output element into a recess that borders on said strainable measuring parts and that has said strain gages therein, and said central longitudinal hole is configured and adapted to receive a cable that is to be connected to said strain gages and sealed in and extending out through said central longitudinal hole.

15. The load cell according to claim 1, wherein said force input element and said force output element both have a same outer configuration and are arranged axially opposite and symmetrically relative to one another, wherein said force input element is spaced axially from a first one of said two ring elements by a first encircling groove, and wherein said force output element is spaced axially from a second one of said two ring elements by a second encircling groove.

16. The load cell according to claim 1, wherein said force input element and said force output element respectively have planar securing surfaces extending parallel to said longitudinal axis, and threaded holes penetrating into said securing surfaces.

17. The load cell according to claim 1, wherein said force input element and said force output element respectively have planar securing surfaces at axially opposite ends of said longitudinally body, wherein said securing surfaces are parallel to one another and perpendicular to said longitudinal axis, and threaded holes penetrate into said securing surfaces.

18. The load cell according to claim 1, wherein said force input element and said force output element respectively have flat securing surfaces, and wherein an entire outer surface of said load cell except said securing surfaces has only rounded surface contours with a smooth surface finish.

19. The load cell according to claim 1, further comprising an anti-adhesion coating on an outer surface of said sleeve, said force input element and said force output element.

20. An aseptic platform scale comprising the load cell according to claim 1, and further comprising a weighing platform coupled to said force input element of said load cell, wherein said scale is suitable for use in an aseptic environment.

21. A load cell, which is embodied rod-shaped and comprises a force input element and a force output element and a force measuring element arranged axially therebetween, whereby the force measuring element comprises a bending beam, of which measuring spring parts have strain gage strips applied thereon and are hermetically tightly enclosed by metal parts, and wherein a force to be measured is introducible perpendicularly to a longitudinal axis of the load cell, wherein the force input element, the force measuring element and the force output element are embodied substantially rotationally symmetrical and rounded-off along the longitudinal axis, and wherein the metal parts comprise two ring elements and a flexurally stiff pipe sleeve which has the measuring spring parts and the strain gages arranged inwardly therein, and wherein the pipe sleeve has a cylindrical outer surface parallel to and coaxially about the longitudinal axis, and wherein ends of the bending beam are fixedly connected with the ring elements which are oriented perpendicularly to the longitudinal axis, and wherein the two ring elements are respectively hermetically sealedly welded to opposite ends of the pipe sleeve at respective radial outer edge areas of the ring elements to form weld joints, whereby the ring elements include concentrically encircling flexurally soft membranes, which connect the pipe sleeve with the bending beam and the force input element and the force output element in a substantially force shunt free manner.

22. An aseptic platform scale comprising the load cell according to claim 21, and further comprising a weighing platform coupled to said force input element of said load cell, wherein said scale is suitable for use in an aseptic environment.

23. The load cell according to claim 21, wherein the force input element, the bending beam, the force output element, and the two ring elements are all together formed as a single integral monolithic piece.

24. The load cell according to claim 1, wherein an axially outwardly exposed surface of each said ring element including said flexurally soft membrane thereof is a flat planar annular disc surface extending perpendicularly to said longitudinal axis, and each said flexurally soft membrane has a thickness less than a thickness of said pipe sleeve.

25. A load cell, which comprises a force input element and a force output element as well as a force measuring element arranged axially therebetween, wherein the force input element, the force measuring element and the force output element are configured substantially rotationally symmetrical and rounded-off along a longitudinal axis, wherein the force measuring element comprises a bending beam having measuring spring parts with strain gage strips applied thereon, wherein a flexurally stiff pipe sleeve outwardly surrounds the measuring spring parts and the strain gage strips that are arranged inwardly within the pipe sleeve, which is further closed relative to an outside environment by two ring elements that act as seals and that are oriented perpendicularly to the longitudinal axis respectively at two opposite ends of the pipe sleeve, wherein two opposite ends of the bending beam are respectively fixedly connected with the two ring elements, and a respective radially outer perimeter region of each one of the ring elements is welded to the pipe sleeve, so that the measuring spring parts of the bending beam and the strain gage strips are hermetically tightly enclosed inwardly within the pipe sleeve, and wherein the ring elements comprise concentrically encircling, flexurally soft membranes that connect the pipe sleeve with the bending beam, the force input element and the force output element in a substantially force shunt free manner with respect to a force to be measured that is introduced to the force input element perpendicularly to the longitudinal axis.

\* \* \* \* \*